United States Patent [19]
Kelley et al.

[11] Patent Number: 5,682,797
[45] Date of Patent: Nov. 4, 1997

[54] ADJUSTMENT LOCK WITH LOCK FINGERS

[75] Inventors: Dixon L. Kelley, New Baltimore; Daniel F. Chegash, Roseville, both of Mich.

[73] Assignee: Teleflex Incorporated, Plymouth Meeting, Pa.

[21] Appl. No.: 676,589

[22] Filed: Jul. 8, 1996

[51] Int. Cl.$^6$ .................................................. F16C 1/14
[52] U.S. Cl. ........................ 74/502.4; 403/316; 403/294; 403/11
[58] Field of Search ........................ 74/502.4, 502.6; 24/459; 403/316, 315, 294, 11

[56] References Cited

U.S. PATENT DOCUMENTS

| | | | |
|---|---|---|---|
| 5,163,338 | 11/1992 | Sharp et al. | 74/502.4 |
| 5,207,116 | 5/1993 | Sultze . | |
| 5,261,292 | 11/1993 | Gabas et al. . | |
| 5,280,733 | 1/1994 | Reasoner . | |
| 5,531,134 | 7/1996 | Petruccello | 74/502.4 |
| 5,571,237 | 11/1996 | Lu et al. | 74/502.4 |
| 5,588,334 | 12/1996 | Lu et al. | 74/502.4 X |
| 5,598,743 | 2/1997 | Yasuda | 74/502.4 |
| 5,605,074 | 2/1997 | Hall et al. | 74/502.4 X |

*Primary Examiner*—Charles A. Marmor
*Assistant Examiner*—Mary Ann Battista
*Attorney, Agent, or Firm*—Howard & Howard

[57] ABSTRACT

A conduit length adjustment device including a tubular housing slidably supporting a cylindrical slider member (24), the housing including a box-like access opening for receiving a U-shaped lock button (26). A pair of lugs (52, 54) are disposed on the exterior of the side walls (38) and each of the legs of the lock button (26) includes a pair of holes (56, 58) for co-acting with the lugs (52, 54) for defining detents for retaining the lock button (26) in unlocked and locked positions respectively. In addition, a pair of latch levers (60) extend parallel to the legs of the lock button (26) and have ramps leading to flat ends for snapping under and abutting a pair of co-acting latch abutments (62), which also have ramps (64, 66) leading to flat abutment surfaces whereby independent and simultaneous forces must be applied to the latch levers (60) and the legs of the lock button (26) to enable removal of the lock button (26) from the locked position.

17 Claims, 2 Drawing Sheets

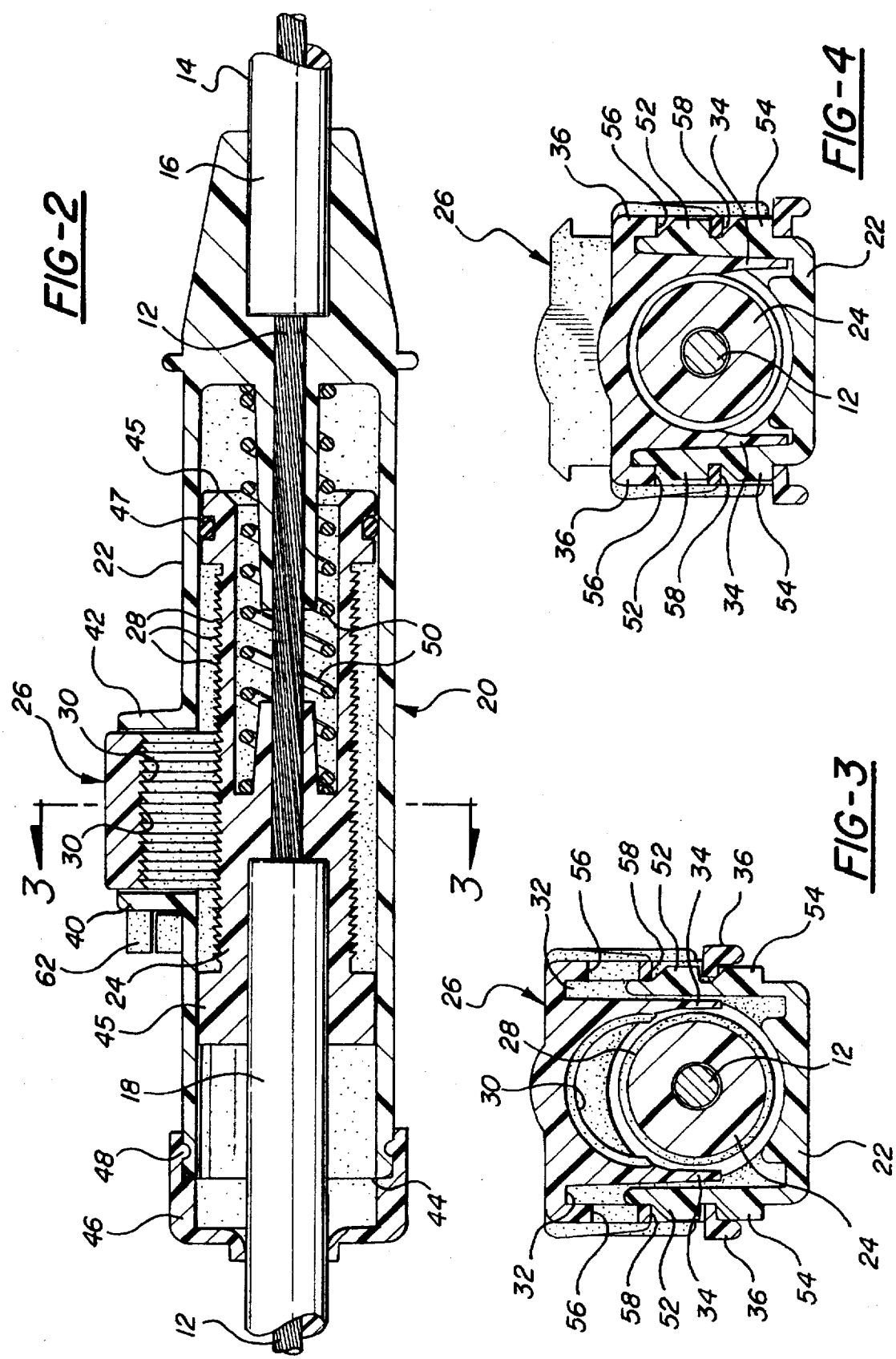

ADJUSTMENT LOCK WITH LOCK FINGERS

TECHNICAL FIELD

This invention relates to a motion-transmitting remote control assembly of the type for transmitting motion along a curved path by a flexible motion-transmitting core element. More specifically, the invention relates to an improved adjustment means by which the length of the conduit is adjusted during installation.

BACKGROUND OF THE INVENTION

Length adjuster assemblies are commonly integrated into control cable assemblies used in motion-transmitting push-pull applications. Such assemblies are widely used in automobiles, such as with transmission shift controls or accelerator controls. These assemblies compensate for variation in distances between mounting points by adjusting the length of the conduit or of the core element. The subject invention relates to the adjustment of the conduit.

Various adjustment assemblies are known to include a locking button having teeth for engaging teeth on a slider member to prevent change in length of the conduit in the installed condition. Examples of such assemblies are shown in U.S. Pat. Nos. 5,178,034 to Reasoner and 5,161,428 to Petruccello, both assigned to the assignee of the subject invention. In some installations it is desirable that it be unequivocally intentional to remove the lock button from the locked position once installed.

SUMMARY OF THE INVENTION AND ADVANTAGES

A motion-transmitting remote-control assembly of the type for transmitting motion along a curved path by a flexible motion-transmitting core element which is slidably supported in a conduit. An adjustment means is disposed along the conduit for adjusting the length of said conduit and includes a lock button movable between an unlocked position allowing adjustment of the length of the conduit and a locked position for preventing any change in the length of the conduit by an unlocked detent for holding the lock button in the unlocked position and a locked detent for holding the lock button in the locked position. The assembly is characterized by including a mechanical latch movable to a latched position for mechanically blocking movement of the lock button from the locked position.

Accordingly, the mechanical latch is movable independently of the detents from the latched position whereby independent forces must be applied to the detents and the latch to remove the lock button from the locked position. Such action requires intentional application of forces in a sychronous manner in order to release the lock button from the locked position after installation.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a longitudinal or axial cross sectional view of the assembly of FIG. 1;

FIG. 3 is a cross sectional view taken substantially along line 3—3 of FIG. 2; and FIG. 4 is a cross sectional view like FIG. 3 but showing the locked position.

DETAILED DESCRIPTION OF THE PREFERRED EMBODIMENT

Figure 1:
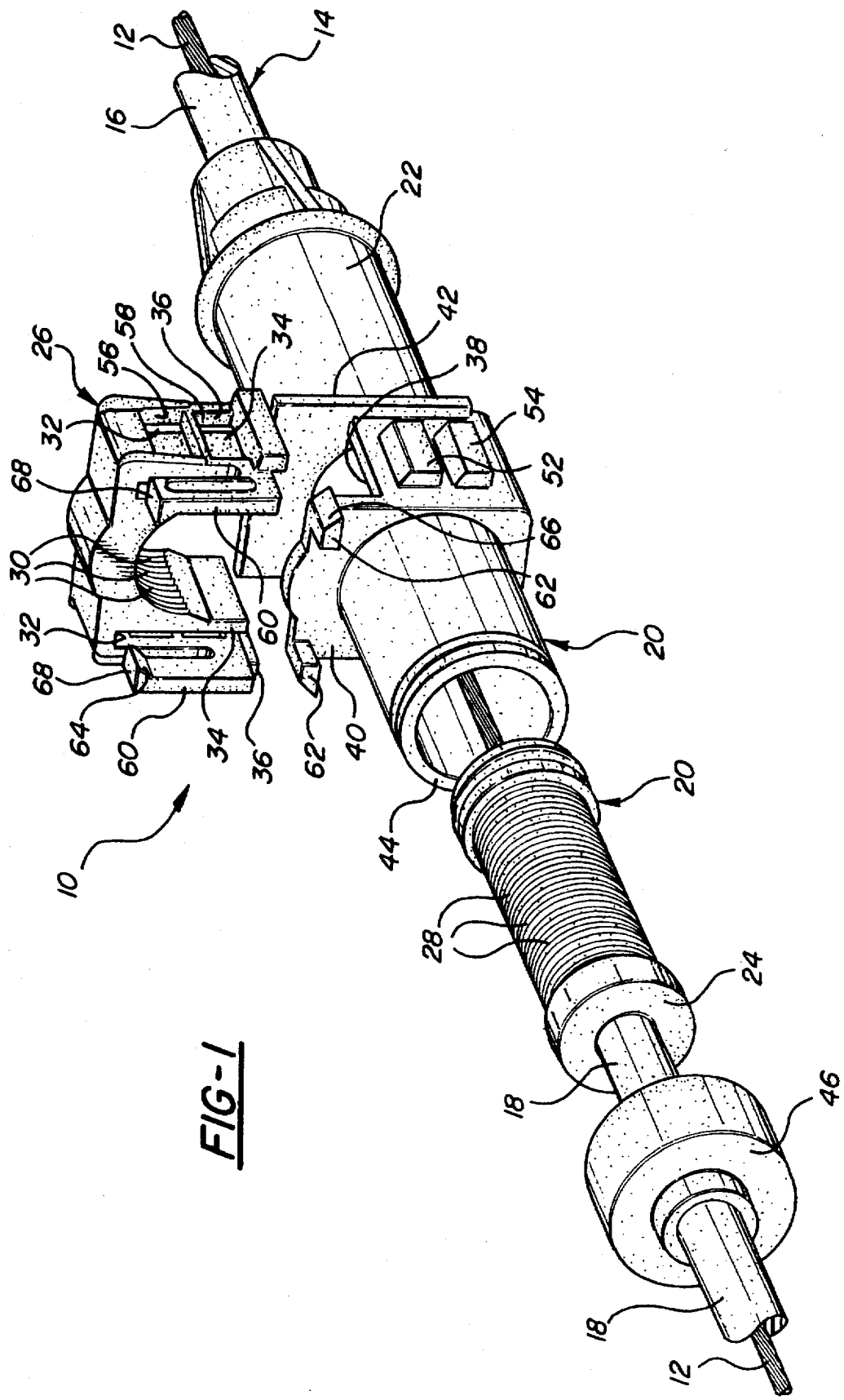
FIG. 1 is an exploded fragmentary view of a preferred embodiment of the subject invention.

Referring to the Figures, wherein like numerals reference like or corresponding parts throughout the several views, a motion-transmitting remote-control assembly is generally shown at 10 and is of the type for transmitting motion along a curved path by a flexible motion-transmitting core element 12, with a conduit 14 slidably supporting the core element 12. The core element 12 typically comprises a wire or a plurality of small wire filaments stranded together. The conduit is divided into first 16 and second 18 conduit sections, although the invention may be utilized with only one conduit section as appreciated by those skilled in the art. The conduit sections 16 and 18 typically comprise an inner tubular member surrounded by tension bearing filaments disposed helically on a long lead about the inner tubular member and surrounded by an extruded casing, the tubular member and the casing being made of organic polymeric material.

The assembly includes an adjustment means generally indicated at 20 and disposed along the conduit for adjusting the overall length of the conduit, i.e., the distance between the outer ends (not shown) of the first 16 and second 18 conduit sections. The adjustment means 20 includes a housing member 22 and a slider member 24 in telescoping relationship within the housing member 22 and a lock button generally indicated at 26. The lock button 26 is movable between an unlocked position, as shown in FIGS. 2 and 3, for allowing adjustment of the overall length of the conduit, and a locked position, as shown in FIG. 4, for preventing any change in the length of the conduit by preventing relative telescoping movement of the slider member 24 axially within the housing member 22, the lock button being supported by the housing member for radial movement between the unlocked and locked positions. The lock button 26 is U-shaped to include a base and parallel legs extending from the base and the slider member 24 and the lock button 26 having co-acting teeth 28 and 30 respectively for interlocking engagement in the locked position to prevent relative axial movement between the housing member 22 and the slider member 24 to prevent any change in length of the conduit 16–18.

Each of the legs of the U-shaped lock button includes a slot 32 extending thereinto from the distal end thereof to divide each of the legs into inner 34 and outer 36 legs, all extending axially of the housing member 22. The housing member 22 presents parallel side walls 38, a front wall 40, and a back wall 42 defining a box-like opening for the lock button 26 to access the slider member 24 therein. The side walls 38 are spaced transversely of the longitudinal axis of the conduit sections 16 and 18 and the back wall 42 is spaced axially from the front wall 40 to define the opposite extremity of the box-like access opening. The side walls 38 are disposed in the slots 32 so that the inner legs 34 and the base of the lock button 26 are disposed in the box-like opening to surround the slider member 24.

The slider member 24 is cylindrical and the housing member 22 is tubular and slidably supports the slider member 24 therein. The front wall 40 and the side walls 38 are disposed along the tubular portion of the housing member 22. The teeth 28 on the slider member 24 extend circumferentially completely around the slider member 24 thereby allowing the slider member 24 to rotate within the housing member 22. Also, the slider member 24 has two enlarged ends 45 which are in sliding engagement with the cylindrical interior of the tubular housing 22 with the teeth 28 disposed along the reduced diameter section which extends between the two enlarged ends 45, one of the enlarged ends supporting an O-ring 47 in an annular groove therein. One end 44 of the tubular housing member 22 is open and a cap 46 is disposed over the tubular member to close the open end, the cap 46 and outer surface of the tubular housing 22 having a tongue and groove snap together retention mechanism 48. The first conduit section 16 is bonded to and extends from the housing member 22 and the second conduit section 18 is bonded to and extends from the slider member 24. The second conduit section 18 therefore extends through and is in sealing engagement with the cap 46. A spring 50 is disposed to react between the housing member 22 and the slider member 24 for urging relative axial movement between the housing member 22 and the slider member 24, i.e., to urge the members 22 and 24 apart in the conduit lengthening direction.

The assembly also includes an unlocked detent for holding the lock button 26 in the unlocked position and a locked detent for holding the lock button 26 in the locked position, the detents being disposed along the outer legs 36 of the lock button 26. More specifically, the detents are defined by upper lugs 52 and lower lugs 54 disposed on the exterior of the side walls 38 and upper holes 56 and lower holes 58 in the outer legs 36 of the lock member 26. The outer legs 36 are disposed on the exterior of the side walls 38 with the lugs 52 and/or 54 extending through the holes 56 and/or 58 in at least one of the detent positions. More specifically, the lower holes 58 are disposed about the upper lugs 52 in the unlocked detent position as shown in FIG. 3 whereas the lower holes 58 are disposed about the lower lugs 54 in the locked position as shown in FIG. 4. In this locked position, the upper holes 56 also surround the upper lugs 52. As will be appreciated, therefore, the assembly may not include the lower lugs 54 as the detent positions may be defined by the lower holes being disposed about the upper lugs 52 in the unlocked position and the upper holes 56 being disposed about the upper lugs 52 in the locked position. However, as shown, both of the upper 52 and lower 54 lugs on each of the side walls 38 are disposed in both of the upper 56 and lower 58 holes, respectively, in the adjacent outer leg 36 when the lock button 26 is in the locked position. As is apparent, the lugs 52 and 54 include slanted or ramp surfaces for forcing the outer legs 36 to flex outwardly during installation, with the outer legs 36 snapping back as the holes surround the respective lugs.

The assembly 10 is characterized by including a mechanical latch movable to a latched position for mechanically blocking movement of the lock button 26 from the locked position, such action being in addition to the detents of the lugs 52–54 and holes 56–58. The latch includes a pair of latch levers 60 (shown in FIG. 1) disposed axially from the adjacent outer legs 36 and a pair of latch abutments 62 disposed on the exterior of the front wall 40 of the housing member 22. The latch abutments 62 extend axially from the front wall 40 adjacent the top edge thereof. The latch levers 60 are connected to the respective outer legs 36 adjacent the lower or distal ends of the legs 36 with the levers 60 extending in a cantilevered fashion parallel to and spaced from the outer legs 36 back toward the base of the lock button 26. Each of the latch abutments 62 co-acts with one of the latch levers 60 as the latch levers 60 and the latch abutments 62 have co-acting ramps or oppositely slanted surfaces 64 and 66 for flexing the latch levers 60 outwardly during movement of the lock button 26 to the locked position. The latch abutments 62 each presents a flat abutment or bottom surface adjacent and extending inwardly from the ramp 66 thereof and the latch levers 60 each presents an end surface 68 adjacent the ramp 64 thereof for snapping under the bottom abutment surface of the associated latch abutment 62 when the lock button 26 reaches the locked position.

Accordingly, the mechanical latch is spaced axially from the detents and is movable independently of the detents from the latched position whereby independent forces must be applied to the detents and the latch to remove the lock button from the locked position. Said another way, in order to remove the lock button 26 from the locked position, it is necessary to manually pull or flex both outer legs 36 outwardly sufficiently to clear the lugs 52 and 54 while simultaneously manually pulling or flexing the latch levers 60 outwardly to clear the abutments 62. This is a relatively difficult task thereby allowing only intentional removal from the locked position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion-transmitting remote-control assembly (10) for transmitting motion along a curved path comprising:

a flexible motion-transmitting core element (12), a conduit (16, 18) slidably supporting said core element (12), adjustment means disposed along one of said core element and said conduit for adjusting the length of one of said core element and said conduit and including a lock button (26) movable between an unlocked position allowing adjustment of the length and a locked position for preventing any change in the length, said lock button (26) being U-shaped to include a base and parallel legs extending from said base, an unlocked detent (52, 58) on said legs for holding said lock button (26) in said unlocked position and a locked detent (52, 56; 54, 58) on said legs for holding said lock button (26) in said locked position; and characterized by including a mechanical latch (60, 62) including a latch lever (60) extending from the distal end of each of said legs and in the opposite direction and movable to a latched position for mechanically blocking movement of said lock button (26) from said locked position.

2. An assembly as set forth in claim 1 wherein said mechanical latch is spaced axially from said detents and is movable independently of said detents from said latched position whereby independent forces must be applied to said detents and said latch to remove said lock button (26) from said locked position.

3. An assembly as set forth in claim 2 wherein said adjustment means includes a housing member (22) and a slider member (24) in telescoping relationship with said housing member (22), said lock button (26) being supported by said housing member (22) for radial movement between said unlocked and locked positions, said slider member (24) and said lock button (26) having co-acting teeth (28, 30) for interlocking engagement in said locked position to prevent relative axial movement between said housing member (22) and said slider member (24) to prevent any change in the length, said detents being disposed along said legs of said lock button (26).

4. An assembly as set forth in claim 3 wherein said latch includes at least one latch abutment (62) disposed on said housing member (22).

5. A motion-transmitting remote-control assembly (10) for transmitting motion along a curved path comprising:

a flexible motion-transmitting core element (12), a conduit (16, 18) slidably supporting said core element (12), adjustment means disposed along one of said core element and said conduit for adjusting the length of one of said core element and said conduit and including a lock button (26) movable between an unlocked position allowing adjustment of the length and a locked position for preventing any change in the length, said adjustment means including a housing member (22) and a slider member (24) in telescoping relationship with said housing member (22), said lock button (26) being supported by said housing member (22) for radial movement between said unlocked and locked positions, said lock button (26) being U-shaped to include a base and parallel legs extending from said base, said slider member (24) and said lock button (26) having co-acting teeth (28, 30) for interlocking engagement in said locked position to prevent relative axial movement between said housing member (22) and said slider member (24) to prevent any change in the length, said detents being disposed along said legs of said lock button (26), an unlocked detent (52, 58) for holding said lock button (26) in said unlocked position and a locked detent (52, 56; 54, 58) for holding said lock button (26) in said locked position, a mechanical latch (60, 62) movable to a latched position for mechanically blocking movement of said lock button (26) from said locked position, said mechanical latch being spaced axially from said locked and unlocked detents and movable independently of said detents from said latched position whereby independent forces must be applied to said detents and said latch to remove said lock button (26) from said locked position, said latch including at least one latch lever (60) extending axially from at least one of said legs and at least one latch abutment (62) disposed on said housing member (22), one of said latch levers (60) being connected to each of said legs adjacent the distal ends of said legs with said latch levers (60) extending in a cantilevered fashion parallel to and spaced from said legs toward said base of said lock button (26).

6. An assembly as set forth in claim 5 wherein each of said legs of said U-shaped lock button (26) includes a slot (32) extending thereinto from said distal end thereof to divide each of said legs into inner (34) and outer (36) legs axially of said housing member (22), said housing member (22) presenting parallel side walls (38) and a front wall (40) defining an opening to access said slider member (24) therein, said side walls (38) being disposed in said slots (32) so that said inner legs (34) and said base of said lock button (26) are disposed in said opening to surround said slider member (24).

7. An assembly as set forth in claim 6 wherein said locked and unlocked detents are defined by lugs (52, 54) disposed on the exterior of said side walls (38) and holes (56, 58) in said outer legs (36), said outer legs (36) being disposed on the exterior of said side walls (38) with said lugs (52, 54) extending through said holes (56, 58) in at least one of said locked and unlocked positions.

8. An assembly as set forth in claim 7 including a pair of said latch abutments (62) extending axially from said front wall (40) adjacent a top edge thereof.

9. An assembly as set forth in claim 8 wherein each of said latch abutments (62) co-acts with one of said latch levers (60), said latch levers (60) and said latch abutments (62) having co-acting ramps (64, 66) for flexing said latch levers (60) during movement of said lock button (26) to said locked position.

10. An assembly as set forth in claim 9 wherein each of said latch abutments (62) presents a flat abutment surface adjacent said ramp (66) thereof and each of said latch levers (60) presents an end surface (68) adjacent the ramp (64) thereof for snapping under said abutment surface of the associated latch abutment (62) when said lock button (26) reaches said locked position.

11. An assembly as set forth in claim 10 wherein said slider member (24) is cylindrical and said housing member (22) is tubular and slidably supports said slider member (24) therein, said front wall (40) and said side walls (38) being disposed along said tubular housing member (22).

12. An assembly as set forth in claim 11 wherein said teeth (28) extend circumferentially around said slider member (24).

13. An assembly as set forth in claim 12 wherein one end (44) of said tubular housing member (22) is open, and including a cap (46) disposed over said tubular housing member (22) to close said open end (44).

14. An assembly as set forth in claim 13 wherein said conduit includes a first conduit section (16) extending from said housing member (22) and a second conduit section (18) extending from said slider member (24), said second conduit section (18) extending through said cap (46).

15. An assembly as set forth in claim 14 including a spring (50) disposed between said housing member (22) and said slider member (24) for urging relative axial movement between said housing member (22) and said slider member (24).

16. An assembly as set forth in claim 15 including a back wall (42) spaced axially from said front wall (40) to define the opposite extremity of said access opening.

17. An assembly as set forth in claim 16 including a pair of said lugs (52, 54) on each of said outer legs (36) and each of said outer legs (36) includes a pair of said holes (56, 58) whereby the lowest hole (58) in each outer leg (36) is disposed about the highest lug (52) on the adjacent side wall (38) to hold said lock button (26) in said unlocked position and both of said lugs (52, 54) on each of said side walls (38) are disposed in both of said holes (56, 58) in the adjacent outer leg (36) when said lock button (26) is in said locked position.

* * * * *